United States Patent
Feifel et al.

(10) Patent No.: US 10,741,077 B2
(45) Date of Patent: Aug. 11, 2020

(54) VEHICLE WARNING DEVICE

(71) Applicant: Continental Teves AG & Co. oHG, Frankfurt am Main (DE)

(72) Inventors: Harald Feifel, Darmstadt (DE); Attila Jaeger, Darmstadt (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 16/337,026

(22) PCT Filed: Oct. 10, 2017

(86) PCT No.: PCT/DE2017/200108
§ 371 (c)(1),
(2) Date: Mar. 27, 2019

(87) PCT Pub. No.: WO2018/068796
PCT Pub. Date: Apr. 19, 2018

(65) Prior Publication Data
US 2020/0066157 A1 Feb. 27, 2020

(30) Foreign Application Priority Data
Oct. 10, 2016 (DE) .......................... 10 2016 219 578

(51) Int. Cl.
*G08G 1/0965* (2006.01)
*G08G 1/16* (2006.01)
(Continued)

(52) U.S. Cl.
CPC ........... *G08G 1/163* (2013.01); *G08G 1/0965* (2013.01); *H04W 4/021* (2013.01); *H04W 4/46* (2018.02)

(58) Field of Classification Search
CPC ..... B60R 1/00; B60R 1/12; B60R 2001/1215; B60R 2001/1253; B60R 2300/302;
(Continued)

(56) References Cited

U.S. PATENT DOCUMENTS 4,671,329 A * 6/1987 Kovacevich, Jr. ... B67D 1/0835
141/5
10,147,322 B2 12/2018 Strassberger et al.
(Continued)

FOREIGN PATENT DOCUMENTS

DE 10257798 A1 7/2004
DE 102012222780 A1 6/2014
(Continued)

OTHER PUBLICATIONS

International Seach Report and Written Opinion for Internatoinal Application No. PCT/DE2017/200108, dated Feb. 6, 2018, 10 pages.
(Continued)

*Primary Examiner* — Daniel Previl
(74) *Attorney, Agent, or Firm* — RatnerPrestia

(57) ABSTRACT

A vehicle warning device for outputting a vehicle warning signal to a first vehicle. The vehicle warning signal displays, prior to the entry of the first vehicle into a danger area, whether a second vehicle located ahead of the first vehicle is located directly behind this danger area, including a first communication interface configured to receive first data. The first data relate to a movement condition of the first vehicle. A second communication interface receives second data from the second vehicle. The second data relate to a movement condition of the second vehicle. A processing device determines, based on the first and second data, a future position of the second vehicle at a predicted time at which the first vehicle is located within the danger area. The
(Continued)

processing device outputs, prior to the entry of the first vehicle into the danger area, the vehicle warning signal to the first vehicle if the determined future position of the second vehicle would cause the first vehicle to stop within this danger area.

12 Claims, 2 Drawing Sheets

(51) Int. Cl.
*H04W 4/46* (2018.01)
*H04W 4/021* (2018.01)

(58) Field of Classification Search
CPC ........ B60R 2300/303; B60R 2300/605; B60R 2300/607; B60R 2300/806; B60R 2300/105; B60R 16/0231; B60R 1/06; B60R 1/1207; B60R 2300/70; G05D 1/0061; B60Q 1/0017; B60Q 1/12; B60Q 1/24; B60Q 1/2665; B60Q 1/2696; B60Q 1/32; B60Q 1/346; B60Q 2300/122; B60Q 2300/142; B60Q 2300/31; B60Q 9/005; B60Q 2300/112; B60Q 9/00; B60Q 1/143; B60Q 1/34; B60Q 1/46; B60Q 2300/134; B60Q 2300/3321; B60Q 3/18; B60Q 3/217; B60Q 3/54; B60Q 3/78; B60Q 3/80; B60Q 2400/30; B60W 50/14; B60W 2040/0872; B60W 2050/146; B60W 40/08; B60W 50/08; B60W 50/16; B60W 2550/408; B60W 2750/306; B60W 2750/308; B60W 2750/40; B60W 40/04; B60W 10/04; B60W 10/18; B60W 10/20; B60W 40/02; B60W 50/0098; G06K 9/00805; G06K 9/00798; G06K 9/00845; G06K 9/00825; A61B 2503/10; A61B 5/18; A61B 5/681; A61B 5/6893; G08G 1/096741; G08G 1/09675; G08G 1/096791; G08G 1/166; G08G 1/091; G08G 1/096716; G08G 1/163; G08G 1/164; H04L 67/12; H04L 69/14; H04N 5/23293; H04N 5/247; H04W 76/14; H04W 84/005; H04W 84/18; H04W 4/46; H04W 76/10; B60H 1/00771; B60H 1/008; B60H 1/00849; B60H 3/0085; B60H 3/0092; B60K 35/00; B60T 8/175; B60T 8/176; F21W 2102/19; G01C 21/20; G01S 19/01; G01S 19/426; G01S 19/43; G01S 19/49; G01S 19/50; G01S 2013/936; G01S 2205/002; H04B 1/3822
USPC ......... 340/902, 425.5, 901, 691.6, 3.1, 3.43, 340/3.9, 5.2, 825.36, 7.55, 7.6, 825.49
See application file for complete search history.

(56) References Cited

U.S. PATENT DOCUMENTS

| | | | |
|---|---|---|---|
| 2006/0116821 A1* | 6/2006 | Kim | G08G 1/164 701/301 |
| 2006/0220801 A1* | 10/2006 | Bauer | G08G 1/163 340/425.5 |
| 2014/0088850 A1* | 3/2014 | Schuberth | B60W 30/16 701/93 |
| 2014/0320637 A1* | 10/2014 | Yi | B60R 1/00 348/118 |
| 2014/0347872 A1* | 11/2014 | Foltin | G06K 9/00825 362/466 |
| 2015/0307131 A1* | 10/2015 | Froeschl | G01S 15/931 701/25 |
| 2015/0310738 A1* | 10/2015 | Karacan | G08G 1/0112 701/117 |
| 2016/0198303 A1* | 7/2016 | Grotendorst | G08G 1/093 370/310 |

FOREIGN PATENT DOCUMENTS

| | | |
|---|---|---|
| DE | 102013109641 B3 | 9/2014 |
| DE | 102013013621 A1 | 2/2015 |
| WO | 2004053813 A1 | 6/2004 |
| WO | 2016046268 A1 | 3/2016 |

OTHER PUBLICATIONS

German Search Report for German Application No. 10 2016 219 578.6, dated Jul. 3, 2017 with partial translation, 9 pages.

* cited by examiner

VEHICLE WARNING DEVICE

CROSS REFERENCE TO RELATED APPLICATIONS

This application is the U.S. National Phase Application of PCT International Application No. PCT/DE2017/200108, filed Oct. 10, 2017, which claims priority to German Patent Application No. 10 2016 219 578.6, filed Oct. 10, 2016, the contents of such applications being incorporated by reference herein.

FIELD OF THE INVENTION

The present invention relates to a vehicle warning device for vehicles for warning about traffic jams in and around a danger area.

BACKGROUND OF THE INVENTION

In the region of danger areas or danger zones such as, for example, at railroad crossings, there is frequently the risk of a collision occurring between a vehicle which would like to cross a railroad crossing and an approaching train, if the vehicle does not notice the approaching train in good time. In order to avoid such situations in and around these danger areas, in particular at railroad crossings, modern vehicles are equipped with appropriate devices which are able to warn a vehicle about an approaching train in the region of a railroad crossing. WO 2016/046268 A1, incorporated herein by reference, discloses an example of such a train warning device for vehicles.

However, dangerous traffic situations can also arise for vehicles, in particular in the region of railroad crossings, if a vehicle has to stop within the region of the railroad crossing because of a traffic jam which can certainly occur and, indeed, before a train approaches the railroad crossing. In this case, such a train warning device is not sufficient for a vehicle to avoid such a situation, since the vehicle is not warned or the warning would be output too late for the vehicle.

SUMMARY OF THE INVENTION

An aspect of the present invention is a vehicle warning device and a method for warning a vehicle about traffic jams in and around danger areas, in particular in the region of railroad crossings, in order to avoid a vehicle having to stop within the danger area of a railroad crossing.

According to a first aspect, the invention relates to a vehicle warning device for outputting a vehicle warning signal to a first vehicle, wherein the vehicle warning signal displays, prior to the entry of the first vehicle into a danger area, whether a second vehicle located ahead of the first vehicle is located directly behind this danger area, comprising a first communication interface which is configured to receive first data, wherein the first data relate to a movement condition of the first vehicle; a second communication interface which is configured to receive second data from the second vehicle, wherein the second data relate to a movement condition of the second vehicle; a processing device which is configured to determine, on the basis of the first data and the second data, a future position of the second vehicle at a predicted time at which the first vehicle is located within the danger area, and wherein the processing device is further configured, prior to the entry of the first vehicle into the danger area, to output the vehicle warning signal to the first vehicle if the determined future position of the second vehicle would cause the first vehicle to stop within this danger area.

The vehicle can be a motor vehicle, in particular a passenger vehicle, a truck, a motorcycle, an electric vehicle or a hybrid vehicle.

In the case of the vehicle warning device according to an aspect of the invention, the advantage is achieved that the vehicle is warned about the danger of a traffic jam in a hazardous region, that means in or around or directly after a danger area, which can be a railroad crossing. This prevents the vehicle from driving into and stopping in said danger area. The vehicle is therefore informed about the danger of a traffic jam directly after the danger area and, indeed, before the vehicle drives into the relevant danger zone. In this way, a collision is avoided between the vehicle and a possibly approaching train within the danger area, if the relevant danger area is configured as a railroad crossing.

According to one embodiment of the present invention, the second communication interface is configured as a Car2X communication interface. This achieves the advantage that the second data from the second vehicle can be received by means of the Car2X technology which is known per se.

According to one embodiment of the present invention, the processing device is configured to send the vehicle warning signal via a wireless Car2X communication interface. This achieves the advantage that the vehicle warning signal can be sent by means of the Car2X technology which is known per se, such that the vehicle warning signal can be processed by the first vehicle.

According to one embodiment of the present invention, the vehicle warning signal displays a traffic jam directly behind the danger area, and wherein the processing device is configured to send information about the danger area together with the vehicle warning signal. This achieves the advantage that the driver of the first vehicle is able to plan their driving route in advance in good time or to adjust their driving behavior in good time, such that the driver avoids driving into the danger zone when they are informed in advance about the characteristics of the danger zone.

According to one embodiment of the present invention, the vehicle warning device comprises an interface controller which is configured to monitor the first communication interface and the second communication interface, and wherein the interface controller is further configured, preferably on the basis of the first data and the second data, to actuate the processing device in order to output a vehicle warning signal to the first vehicle. This achieves the advantage that the first communication interface, the second communication interface and the processing device can be actuated centrally.

According to one embodiment of the present invention, the first communication interface is configured as a wired or wireless communication interface. This achieves the advantage that the first communication interface of the first vehicle can be connected to a wired data network of the first vehicle, in order to receive vehicle data which relate to the movement condition of the first vehicle, or the first communication interface of the first vehicle can be connected to a wireless data network of the first vehicle, in order to receive first data which relate to the movement condition of the first vehicle.

According to one embodiment of the present invention, the vehicle warning device comprises a display device in order to visually and/or acoustically display the vehicle warning signal. This achieves the advantage that the vehicle warning signal can be displayed by the display device which can be configured, for example, as a screen and/or as an acoustic signal source in the form of a loudspeaker, without having to install additional or further display devices within the first vehicle. A further advantage is that the driver of the first vehicle can be warned, in different ways and as a function of the traffic situation in which the first vehicle could find itself and that is determined, i.e. calculated, in advance, before the first vehicle drives into a danger zone.

According to one embodiment of the present invention, the vehicle warning device can be installed within the first vehicle. This achieves the advantage that a vehicle warning device installed in the first vehicle can be directly connected to a data network of the first vehicle.

According to one embodiment of the present invention, the danger area is configured as a railroad crossing. The railroad crossing can, in this case, be configured as a railroad crossing with or without gates.

According to a second aspect, the invention relates to a method for outputting a vehicle warning signal to a first vehicle, wherein the vehicle warning signal displays, prior to the entry of the first vehicle into a danger area, whether a second vehicle located ahead of the first vehicle is located directly behind this danger area, comprising the steps of: receiving first data, wherein the first data relate to a movement condition of the first vehicle; receiving second data, wherein the second data relate to a movement condition of the second vehicle; determining a future position of the second vehicle at a predicted time at which the first vehicle is located within the danger area, on the basis of the first data and the second data; outputting a vehicle warning signal to a first vehicle prior to the entry of the first vehicle into the danger area, if the determined future position of the second vehicle would cause the first vehicle to stop within this danger area.

According to a third aspect, the invention relates to a vehicle having a vehicle warning device.

BRIEF DESCRIPTION OF THE DRAWINGS

Further embodiment examples are explained in greater detail below, with reference to the appended figures, wherein.

DETAILED DESCRIPTION OF THE PREFERRED EMBODIMENTS

Reference is made in the following detailed description to the appended drawings which form a part hereof and in which specific embodiments are shown, by way of illustration, in which an aspect of the invention can be executed. It is understood that other embodiments can also be used and structural or logical changes can be made, without departing from the concept of an aspect of the present invention. The following detailed description is therefore not to be understood to limit aspects of the invention. It is additionally understood that the features of the various embodiment examples described herein can be combined with one another, unless otherwise specifically indicated.

Figure 1:
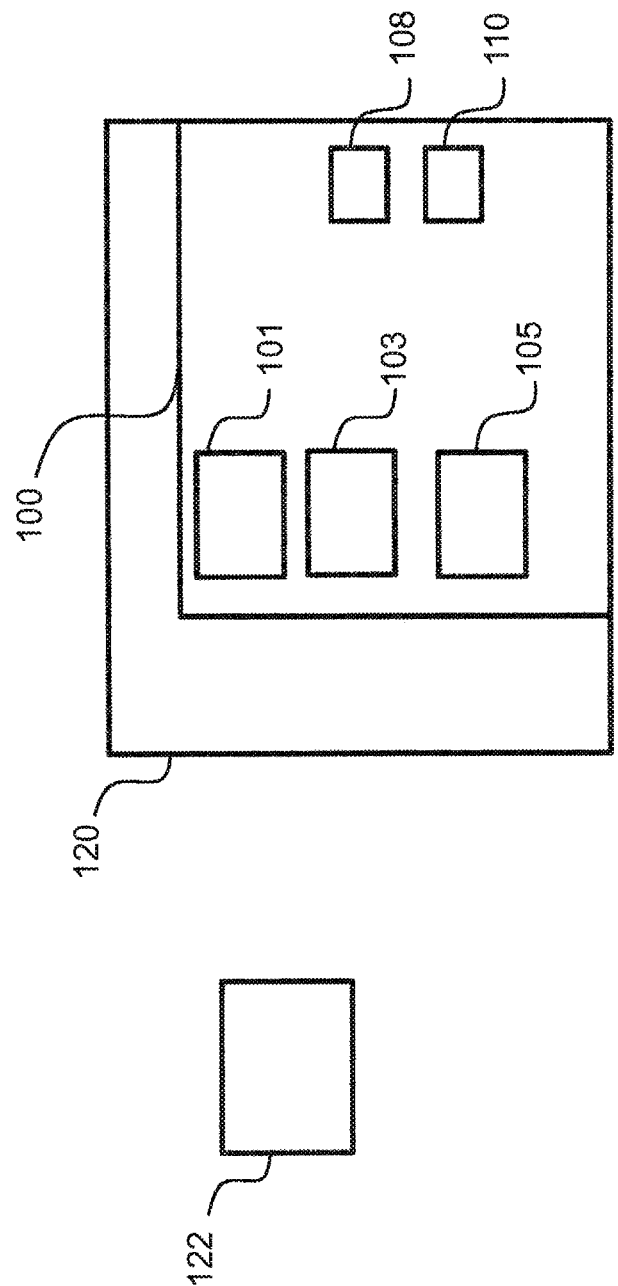
FIG. 1 shows a schematic illustration of a vehicle warning device according to one embodiment of the present invention.

FIG. 1 shows a vehicle warning device 100 for outputting a vehicle warning signal to a first vehicle 120, wherein the vehicle warning signal displays, prior to the entry of the first vehicle 120 into a danger area, whether a second vehicle 122 located ahead of the first vehicle 120 is located directly behind this danger area, comprising a first communication interface 101 which is configured to receive first data, wherein the first data relate to a movement condition of the first vehicle 120; a second communication interface 103 which is configured to receive second data from the second vehicle 122, wherein the second data relate to a movement condition of the second vehicle 122; a processing device 105 which is configured, on the basis of the first data and the second data, to determine a future position of the second vehicle 122 at a predicted time at which the first vehicle 120 is located within the danger area, and wherein the processing device 105 is further configured, prior to the entry of the first vehicle 120 into the danger area, to output the vehicle warning signal to the first vehicle 120 if the determined future position of the second vehicle 122 would cause the first vehicle 120 to stop within this danger area.

In this connection, it should be mentioned that the information about the movement condition of the first vehicle 120 and of the second vehicle 122 can, in each case, include information about a current speed, a current position or vehicle-specific data such as, for example, the dimensions or a vehicle model indication of the respective vehicle.

The processing device 105 can send the vehicle warning signal by means of a wireless Car2X communication network. In this way, the Car2X technology which is known per se can be used. Moreover, the processing device 105 can also be configured to send the vehicle warning signal by means of the Car2X technology to further vehicles.

The first communication interface 101 can be a wired or a wireless communication interface. In this way, the first communication interface 101 can be connected to a wired data network of the first vehicle 120 in order to control vehicle data which relate to the movement condition of the first vehicle 120. In addition, the first communication interface 101 can be configured as a wireless communication interface which can be connected to a wireless data network of the first vehicle 120, in order to obtain first data which relate to the movement condition of the first vehicle 120.

The second communication interface 103 can be a Car2X communication interface. In one embodiment of the present invention, the first communication interface 101 can also be a Car2X communication interface. This can in particular be of use if the first communication interface 101 communicates, for example, with other technical components of the vehicle warning device 100 and/or with other—external— devices which can be connected to the first vehicle 120 in order to exchange data with one another.

In this connection, it should be mentioned that the second vehicle 122, which sends the second data, comprises a communication interface which is not represented in FIG. 1. This communication interface of the second vehicle 122 can preferably be a Car2X communication interface, so that the second vehicle 122 can communicate with the first vehicle 120 in the best possible way.

The vehicle warning signal indicates a traffic jam, which has already been formed in or directly behind or after the danger area or the danger zone by waiting vehicles, to the driver of the first vehicle 120, and wherein the processing device 105 is configured to output information regarding the danger zone together with the vehicle warning signal. In this way, the driver of the first vehicle 120 is not only warned about a traffic jam which can preferably be located around or directly after or behind the relevant danger area. The driver of the first vehicle 120 is therefore also informed about the danger area itself, for example about the exact distance of their vehicle 120 from the relevant danger area.

This can constitute useful information for the driver of the first vehicle 120, since this information makes it possible for the driver to react in good time to a particular traffic situation in, around or after the danger area, for example by driving around the danger area in good time.

The information about an imminent danger area on the route of the first vehicle 120 can be obtained in different ways:

A first possibility involves the processing device 105 being connected to a local database which is installed in the first vehicle 120. The local database can, in this case, include the necessary information about the relevant danger area.

A second possibility involves the processing device 105 being connected to an external database installed outside the first vehicle 105, in order to be able to call up the necessary information about the respective danger area in good time. For this application, the vehicle warning device 100 can comprise a third communication interface which is not shown in FIG. 1. The processing device 105 can then be connected by means of the third communication interface to this external database, in order to call up detailed and updated information about the relevant danger area or the relevant danger zone to be expected. The third communication interface can, in this case, likewise be configured as a Car2X communication interface, which can then in particular be advantageous, since the information about the danger area can also be received from other vehicles which likewise use the known Car2X technology and which are, in some circumstances, already located closer to the relevant and imminent danger area. Alternatively, the first vehicle 120 can also transmit the relevant information about the imminent danger area to other vehicles if these are also equipped with Car2X technology and are possibly located behind the first vehicle 120.

The danger area can in particular be a railroad crossing with or without gates. However, aspects of the present invention are not limited to such danger areas. For example, danger areas such as, for instance, a suspension bridge or, in the most general sense, a bridge which is to be crossed by the first vehicle 120 and which is located, for example, within a predicted and planned driving route of the first vehicle, can be considered for an aspect of the present invention, in particular if a traffic jam behind the bridge would cause the first vehicle 120 to stop on the bridge, in order to wait to continue crossing the bridge until the traffic jam has dissipated.

The vehicle warning device 100, as represented in FIG. 1, comprises an interface controller 108 which monitors and can, if applicable, also actuate the first communication interface 101 and second communication interface 103, and which, preferably on the basis of the first data and second data, actuates the processing device 105 such that the latter outputs a vehicle warning signal to the first vehicle 120. The interface controller 108 therefore makes it possible to control the first communication interface 101, the second communication interface 103 and the processing device 105 centrally in an efficient manner.

Furthermore, the vehicle warning device 100 according to FIG. 1 comprises a display device 110 for visually and/or acoustically displaying the vehicle warning signal. The display device 110 can, in this case, comprise a screen for displaying the vehicle warning signal in a visual manner. The display device 110 can, however, also be configured to display or output the appropriate vehicle warning signal in an acoustic manner, for example by means of a loudspeaker, wherein the loudspeaker can be a part of the display device 110.

However, in one embodiment of the present invention, the display device 110 can also provide only one media communication interface, in order to be able to utilize display devices already installed in the first vehicle 120. In this application, the main object of the display device 110 is then to translate the vehicle warning signal provided by the processing device 105 into an appropriate data format which can then be read by the display devices already provided and installed such as, for example, a head-up display, within the first vehicle 120. Such display devices can, by way of example, be installed as navigation units having a screen and/or loudspeaker within the first vehicle 120, in order to display the vehicle warning signal to be output in a visual and/or acoustic manner. The advantage of such an embodiment of the display device 110 is that the dimensions of the vehicle warning device 100 can be kept to a minimum, and display units already existing and installed in the first vehicle 120 can be utilized to display or output the vehicle warning signal.

In this connection, it should be mentioned that the way in which the vehicle warning signal is output by means of the relevant display device 110 can also be made dependent on the respective traffic situation in and around the relevant danger area. This means that the processing device 105 can individually decide, for every traffic situation which may possibly occur and be predicted, preferably on the basis of the first data and second data, which type of vehicle warning signal is output to the driver of the first vehicle 120 or in which way the vehicle warning signal is transmitted to the driver of the first vehicle 120. The processing device 105 can, to this end, accordingly assume control of the display device 110 in order to ensure that the proper vehicle warning signal, which is adapted to the respective traffic situation, is output—either by means of the display device 110 and/or by means of other appropriate additional display devices within the first vehicle 120, which are then accordingly actuated by the processing device 105.

The vehicle warning device 100 can be installed within the first vehicle 120 and preferably on a plug & play basis, if the first vehicle 120 has the necessary physical connectors which are not represented in FIG. 1. As a result, the vehicle warning device 100 can be very easily removed from the first vehicle 120 and reinserted, for example for maintenance or software updates.

Figure 2:
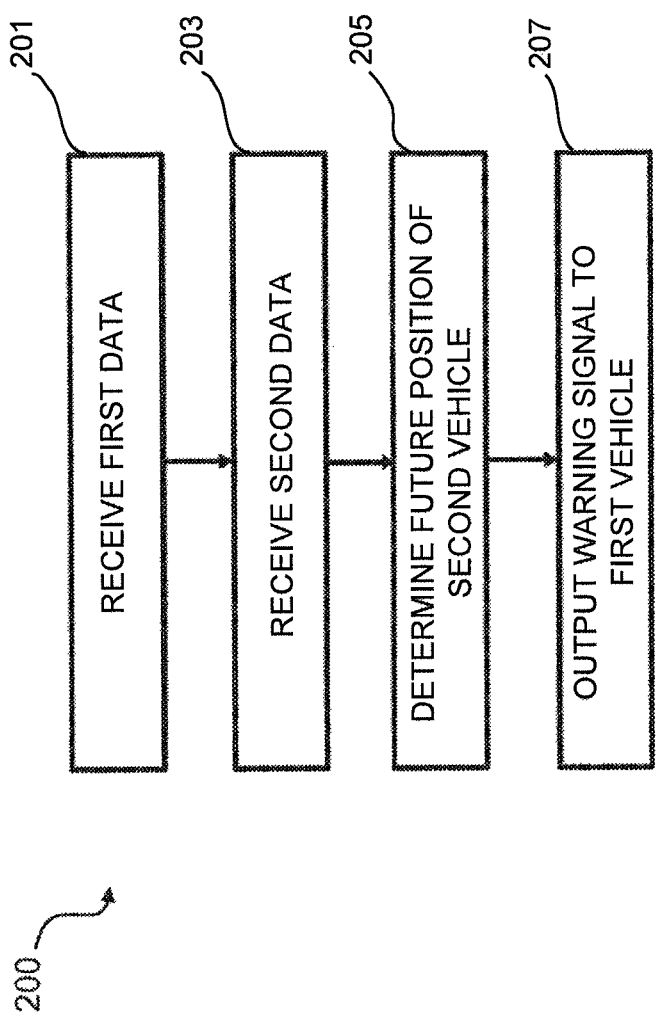
FIG. 2 shows a diagram of a method for outputting a vehicle warning signal to a first vehicle.

FIG. 2 shows a diagram of a method for outputting a vehicle warning signal to a first vehicle 120, wherein the vehicle warning signal displays, prior to the entry of the first vehicle 120 into a danger area, whether a second vehicle 122 located ahead of the first vehicle 120 is located directly behind this danger area. The method 200 comprises a first step 201 of receiving first data, wherein the first data relate to a movement condition of the first vehicle 120. The method 200 comprises a second step 203 of receiving the second data, wherein the second data relate to a movement condition of the second vehicle 122. The method 200 comprises a third step 205 of determining a future position of the second vehicle 122 at a predicted time at which the first vehicle 120 is located within the danger area, on the basis of the first data and the second data. The method 200 comprises a fourth step 207 of outputting the vehicle warning signal to a first vehicle 120, prior to the entry of the first vehicle 120 into the danger area, if the determined future position of the second vehicle 122 would cause the first vehicle 120 to stop within this danger area.

LIST OF REFERENCE NUMERALS

100 Vehicle warning device
101 First communication interface

103 Second communication interface
105 Processing device
108 Interface controller
110 Display device
120 First vehicle
122 Second vehicle
200 Method
201 Receiving first data
203 Receiving second data
205 Determining a future position
207 Outputting a vehicle warning signal

The invention claimed is:

1. A vehicle warning device for outputting a vehicle warning signal to a first vehicle traveling on a roadway, wherein the vehicle warning signal displays, prior to the entry of the first vehicle into a danger area, comprising:
    a first communication interface which is configured to receive first data, wherein the first data relate to a movement condition of the first vehicle;
    a second communication interface which is configured to receive second data from the second vehicle, wherein the second data relate to a movement condition of the second vehicle, wherein the second vehicle is located ahead of the first vehicle, and is traveling in a same direction as the first vehicle; and
    a processing device which is configured to:
        predict, on the basis of the first data and the second data, a future position of the second vehicle at a future time at which the second vehicle has proceeded through the danger area such that the danger area is located behind the second vehicle, and the first vehicle is predicted to be located within the danger area, and
        prior to the entry of the first vehicle into the danger area, output the vehicle warning signal to the first vehicle if the predicted future position of the second vehicle would cause the first vehicle to stop within this danger area due to being impeded from proceeding through the danger area by the second vehicle.

2. The vehicle warning device according to claim 1, wherein the second communication interface is configured as a Car2X communication interface.

3. The vehicle warning device according to claim 2, wherein the processing device is configured to send the vehicle warning signal via a wireless Car2X communication interface.

4. The vehicle warning device according to claim 1, wherein the processing device is configured to send the vehicle warning signal via a wireless Car2X communication interface.

5. The vehicle warning device according to claim 1, wherein the vehicle warning signal displays a traffic jam directly behind the danger area, and wherein the processing device is configured to send information about the danger area together with the vehicle warning signal.

6. The vehicle warning device according to claim 1, wherein the vehicle warning device comprises an interface controller which is configured to monitor the first communication interface and the second communication interface, and wherein the interface controller is further configured, preferably on the basis of the first data and the second data, to actuate the processing device in order to output a vehicle warning signal to the first vehicle.

7. The vehicle warning device according to claim 1, wherein the first communication interface is configured as a wired or wireless communication interface.

8. The vehicle warning device according to claim 1, wherein the vehicle warning device comprises a display device in order to visually and/or acoustically display the vehicle warning signal.

9. The vehicle warning device according to claim 1, wherein the vehicle warning device can be installed within the first vehicle.

10. The vehicle warning device according to claim 1, wherein the danger area is configured as a railroad crossing.

11. A vehicle having a vehicle warning device according to claim 1.

12. A method for outputting a vehicle warning signal to a first vehicle traveling on a roadway, wherein the vehicle warning signal displays, prior to the entry of the first vehicle into a danger area, comprising:
    receiving first data, wherein the first data relate to a movement condition of the first vehicle;
    receiving second data, wherein the second data relate to a movement condition of the second vehicle, wherein the second vehicle is located ahead of the first vehicle, and is traveling in a same direction as the first vehicle;
    predicting, on the basis of the first data and the second data, a future position of the second vehicle at a future time at which the second vehicle has proceeded through the danger area such that the danger area is located behind the second vehicle, and the first vehicle is predicted to be located within the danger area; and
    outputting the vehicle warning signal to a first vehicle prior to the entry of the first vehicle into the danger area, if the predicted future position of the second vehicle would cause the first vehicle to stop within this danger area due to being impeded from proceeding through the danger area by the second vehicle.

* * * * *